(12) United States Patent
Sang et al.

(10) Patent No.: US 10,551,939 B2
(45) Date of Patent: Feb. 4, 2020

(54) ATTITUDE DETECTING DEVICE

(71) Applicants: Yinan Sang, Sonderborg (DK);
Zhuocheng Gong, Sonderborg (DK);
Liping Shi, Sonderborg (DK)

(72) Inventors: Yinan Sang, Sonderborg (DK);
Zhuocheng Gong, Sonderborg (DK);
Liping Shi, Sonderborg (DK)

(73) Assignee: SYD DYNAMICS APS, Odense M (DK)

( * ) Notice: Subject to any disclaimer, the term of this patent is extended or adjusted under 35 U.S.C. 154(b) by 0 days.

(21) Appl. No.: 15/557,528

(22) PCT Filed: Apr. 10, 2016

(86) PCT No.: PCT/DK2016/050068
§ 371 (c)(1),
(2) Date: Sep. 12, 2017

(87) PCT Pub. No.: WO2016/146130
PCT Pub. Date: Sep. 22, 2016

(65) Prior Publication Data
US 2018/0088685 A1    Mar. 29, 2018

(30) Foreign Application Priority Data

Mar. 13, 2015   (DK) ................. 2015 00154

(51) Int. Cl.
*G06F 3/0346*    (2013.01)
*G01B 21/22*    (2006.01)
(Continued)

(52) U.S. Cl.
CPC ........... *G06F 3/0346* (2013.01); *G01B 21/22* (2013.01); *G06F 3/017* (2013.01); *G06F 3/0383* (2013.01); *H04N 21/42222* (2013.01)

(58) Field of Classification Search
CPC ...... G06F 3/0346; G06F 3/017; G06F 3/0383; G01B 21/22; G01C 21/165; H04N 21/42222
See application file for complete search history.

(56) References Cited

U.S. PATENT DOCUMENTS 6,624,833 B1 * 9/2003 Kumar .................... G06F 3/017
345/156
6,636,826 B1 * 10/2003 Abe ....................... G01C 19/56
702/151
(Continued)

FOREIGN PATENT DOCUMENTS

JP    H0764710 A    3/1995

OTHER PUBLICATIONS

International Search Report for PCT Serial No. PCT/DK2016/050068 dated May 31, 2016.

*Primary Examiner* — Sejoon Ahn
(74) *Attorney, Agent, or Firm* — McCormick, Paulding & Huber PLLC (57) ABSTRACT

The present invention relates to an attitude detecting device requiring no optical nor visual sensors but instead using an advanced processing method, which can be used in applications such as data-login, measurements, motion control, cursor pointing on graphic user interfaces, gaming, etc. The device includes inertial measurement units (IMU) such as accelerometers, gyroscopes and may also include magnetometers. The method utilizes the IMU's sensor data and uses a revised method to transfer 3-dimensional rotations into a representation, such as quaternions, Euler angles, yaw, pitch, and roll. The method also provides better performance when the device recovers from interrupts. The method further utilizes the above mentioned representation and turns it into 2-dimensional values in a precise way while inten- (Continued)

tionally remove the effects caused by rotation in the other unused degree of freedom.

19 Claims, 7 Drawing Sheets

(51) Int. Cl.
  *G06F 3/01* (2006.01)
  *G06F 3/038* (2013.01)
  *H04N 21/422* (2011.01)

(56) References Cited

U.S. PATENT DOCUMENTS

| | | | |
|---|---|---|---|
| 8,289,316 B1* | 10/2012 | Reisman | G06F 3/0425 345/173 |
| 8,884,877 B2 | 11/2014 | Caritu et al. | |
| 9,513,130 B1* | 12/2016 | Boggs | G01C 21/165 |
| 10,338,789 B2* | 7/2019 | Ording | |
| 10,359,905 B2* | 7/2019 | Cook | |
| 10,386,980 B2* | 8/2019 | King | |
| 2006/0092133 A1* | 5/2006 | Touma | G06F 3/0346 345/158 |
| 2008/0204406 A1* | 8/2008 | Ueno | A63F 13/06 345/156 |
| 2009/0153475 A1* | 6/2009 | Kerr | H04N 5/4403 345/157 |
| 2009/0153478 A1* | 6/2009 | Kerr | H04N 5/4403 345/158 |
| 2012/0038549 A1* | 2/2012 | Mandella | G06F 3/011 345/156 |
| 2012/0075183 A1 | 3/2012 | Liberty | |
| 2013/0106697 A1 | 5/2013 | Kulik | |
| 2013/0332064 A1 | 12/2013 | Funk et al. | |
| 2017/0277282 A1* | 9/2017 | Go | G06F 1/1694 |
| 2018/0357878 A1* | 12/2018 | Shapiro | H05K 1/0278 |
| 2018/0359369 A1* | 12/2018 | Golshenas | H04M 15/8214 |

* cited by examiner

ATTITUDE DETECTING DEVICE

CROSS-REFERENCE TO RELATED APPLICATIONS

This application is a National Stage application of International Patent Application No. PCT/DK2016/050068, filed on Mar. 10, 2016, which claims priority to Danish Patent Application No. PA201500154, filed on Mar. 13, 2015, each of which is hereby incorporated by reference in its entirety.

TECHNICAL FIELD

The present invention relates to a method to attitude, or orientation, detection of a device, and to the device comprising attitude detecting means, or sensors. The method require no data from e.g. optical or visual sensors but uses instead a processing method translating measured data from the attitude detecting means in the device into a mathematical representation. The method can be used in applications or devices such as for data-login, measurements, motion control, cursor pointing on graphic user interfaces, gaming, etc.

The device includes attitude detecting means, or sensors, such as inertial measurement units (IMU) like accelerometers, gyroscopes and may also include magnetometers.

The method utilizes the data obtained from the attitude detecting means, like IMU's sensor data, and uses a method to transfer 3-dimensional rotations into a mathematical representation, such as quaternions or the Euler angles, yaw, pitch, and roll.

The method in an embodiment includes the step of turning the 3-dimensional data into 2-dimensional values in a precise way while intentionally remove the effects caused by rotation in the other unused degree of freedom.

BACKGROUND

Pointing pens is well known in the art, such as e.g. disclosed in JPH0764710A relating to the problem providing the data input unit which needed neither mechanical and physical contact of a mouse component, nor the plane for moving a mouse component, and was excellent also in the resistance to environment. This is solved by having a vibration gyroscope arranged as a detection means for the present invention to detect a moving direction and move speed, The movement control means which performs the movement controls of the X-axis and a Y-axis by three operation switches, The signal transformation output means converted and outputted to the pulse signal which shows the moving direction to each and move speed of the X-axis and a Y-axis from the above-mentioned vibration gyroscope signal and the three above-mentioned switch signals. The data input unit providing with the movable mouse component which has accommodated the above-mentioned vibration gyroscope, the movement control means, and the signal transformation output means is obtained.

In another document, US2013/0332064, an attitude detecting device is disclosed comprising an inertial measurement unit (IMU) having at least one accelerometer and one gyroscope, and wherein the initial values from 3-axis accelerometers and 3-axis gyros are three-dimensional and transferred under the assumption that the device is at rest on the earth. In the document it is suggested using a quaternion representation to avoid the singularities in the Euler angle parameterization when pitch approaches ±90°.

The problem of the prior art is in applications such as battery powered devices e.g. to recover from sleep mode and immediately to outputs correct orientations, such that frequent switching between sleep mode and activate mode becomes practical and thus more energy can be saved, where the prior art solutions have to wait until the output becomes stable each time upon power on, interrupts or reset.

For pointing devices using tilt compensation when the device is rotated around the axis which aligned to the pointing direction, the tilt compensation only works under limited boundaries, the prior art is significantly more complex in designing the equations in order to work correctly, meaning the calculation should be carefully designed based on different tilt conditions, to work correctly.

In pointing devices, it is common to use tilt compensation. When the device is rotated around the axis aligned to the pointing direction, the tilt compensation however only works under limited boundaries, i.e. if the rotation is beyond the limit, it will not work correctly anymore. One example of a device using tilt compensation is seen in U.S. Pat. No. 8,884,877, which represents a classic strategy to do compensation when the sensor frame is tilted. It uses various sinus and cosines which are time consuming processes on an embedded device and further firstly requires a calculation of the tilt angle. In addition, if the tilting of the x is considered too, then the calculation will be even more complex, and it needs to be checked that the sinus and cosines works well in every quadrant and if the transition from one quadrant to another is smooth. The "quadrant" can be defined such as the quadrant a particular axes of the tilted sensor frame resides in the non-tilted sensor frame.

SUMMARY

The object of the present system is to introduce a device and a method providing improved performance of the tracking of the device, such as when the device recovers from interrupts. It further features the ability to dynamically adjust gain values, or weight values, of calculations when processing the measured sensor data, providing faster convergence of the output result and dynamically adjust the degree of confidence on the measured accelerometer and/or magnetometer data to increase the preciseness.

It further is an object to introduce a new method with no tilt angle considerations since it is irrelevant to the calculation.

The present invention solves the above problems by introducing an attitude detecting device requiring no optical nor visual sensors but instead using an advanced processing method, which can be used in applications such as data-login, measurements, motion control, cursor pointing on graphic user interfaces, gaming, etc.

The device includes inertial measurement units (IMU) such as at least one or more preferably 2 or 3 accelerometers, at least one or more preferably 2 or 3 gyroscopes and may also include at least one or more preferably 2 or 3, magnetometers.

The method utilizes the IMU's sensor data and uses a revised method to transfer 3-dimensional rotations into a representation, such as quaternions, Euler angles, yaw, pitch, and roll.

The method introduces an approach to dynamically adjust the confidence on the measurements to increase the speed of convergence of the output results with better preciseness.

The method also provides improved performance when the device recovers from interrupts.

The method further utilizes the above mentioned representation and turns it into 2-dimensional values in a precise way, while intentionally remove the effects caused by rotation in the other unused degree of freedom.

The transformation purpose is to turn 3-dimensional rotation representations such as quaternions and Euler angles into meaningful 2-dimensional data. The results can be used for many real applications such as computer mouse cursor control, X-Y data plotting and analyzing and angle measurement of mechanical structures.

The advantage of the proposed method is to eliminate the effects induced by the rotation at the remaining dimension.

Another advantage of the proposed method is to increase preciseness and remove singularities compared to using roll, pith and yaw directly.

The transformation includes different modes, as described below. The description is based on a principle coordinate system (XYZ) fixed to the ground, with Z axis being parallel to the direction of gravity. For the basic modes—Horizontal Mode and Vertical Mode—each features a re-configurable coordinate system which is calculated at initialization procedures, in order to fit into the shape and initial position of the measured object.

In an embodiment the device is being operated in a 3-dimensional movement and where it's orientation is translated into a mathematical 3D representation that then further is transformed into a mathematical 2D presentation, where the device includes an attitude, or orientation, detecting means, where the mathematical representation transformation uses to remove the effects of an unused degree of freedom, thus easing the projection of the 3D orientation to a 2D representation.

To represent the device in mathematical terms an object orientation vector F is introduced, where the 2D representation is calculated based on the object orientation vector F seen on the two used degrees of freedom.

To keep track of the device orientation in includes a number of different and non-related sensors that independently from each other measures its changes orientation, or just actual orientation, such as that the detecting means includes an accelerometer and gyroscope and optionally a magnetometer.

To give a full 3-dimensional mathematical representation of the orientation of the object, in one embodiment the device comprises least three of one or some of the said accelerometer, gyroscope and/or magnetometer positioned to generate a measured sensor data vector, such as a measurement acceleration vector A=(Ax, Ay, Az), gyroscope vector ω=(ωx, ωy, ωz) and/or magnetic vector M=(Mx, My, Mz).

In one embodiment the mathematical representation includes a world frame being a basic reference frame coordinate system (X, Y, Z) being fixed and a sensor frame (X', Y', Z') being a rotation of the world frame (X, Y, Z), and where the object orientation is represented by the vector F (X1, Y1, Z1) in the sensor frame (X', Y', Z'), where the world frame is fixed to the ground, in an embodiment with one axis Z parallel to the direction of gravity, whereas the sensor is fixed to the sensors of the detecting means and where the vector F is oriented such that it is parallel with the line of the unused degree of freedom. This thus eases the mathematical translation from 3-dimensions to two-dimensions by the projection of the vector F to the used To make the mathematical calculations, the present orientation of the object is estimated through the changes in orientation as registered by the sensors including the steps of estimating a mathematical transition operator between two orientation, where this transition operator is estimated on the basis the measured sensor data, such as acceleration vector A=(Ax, Ay, Az), gyroscope vector ω=(ωx, ωy, ωz) and/or magnetic vector M=(Mx, My, Mz) and where the mathematical representation of the object is calculated based on such iterations of calculations, where the calculated object orientation is used as the input orientation of the object at the next iteration when a new transition operator is estimated based on new sensor data and were the embodiment includes dynamical calculations of the two gain parameters based on the following equations.

Since the calculations include independently measured input to the orientation from more than one sensor, these are weighted according to how precise they at a present orientation are expected to be, thus in the calculation some of the measured sensor data are weighted by dynamically changing gain parameters being the dynamically calculated depending on the actual measured sensor data parameters.

In one embodiment one mathematical representation of the orientation changes of the device is represented in quaternions and the transition operator being a quaternion q, and where iteration calculations of the new quaternion representing the latest change in position of the object as measured by the detecting means is calculated according to an equation $$q_{i+1}=q_i+(dq_{\omega,i}-\eta \times dq_{a,i}-\zeta \times dq_{m,i}) \times dT$$

where η and ζ are gain values, or weights, dT is the time elapsed since last measurement and $dq_{\omega,i}$, $dq_{a,i}$ and $dq_{m,i}$ are the gradient, or correction, of the respective quaternions solution during the iteration.

In one embodiment gain, or the weights of the parameters in the calculations, comprise the gain formed of two weight, or thrust, values η and ζ, where these are calculated according to equation the equations $$\eta = \sqrt{\frac{3}{4}} \times \frac{\pi}{2} \times (1 - \cos\theta_\eta) \times d_\eta$$

$$\zeta = \sqrt{\frac{3}{4}} \times \frac{\pi}{2} \times (1 - \cos\theta_\zeta) \times d_\zeta$$

where $$1 - \cos\theta_\eta = 1 - \frac{q_i \otimes A_i \otimes q_i^* \cdot A_r}{\|q_i \otimes A_i \otimes q_i^*\|\|A_r\|} = 1 - \frac{q_i^* \otimes A_r \otimes q_i \cdot A_i}{\|q_i^* \otimes A_r \otimes q_i\|\|A_i\|}$$

and $$1 - \cos\theta_\zeta = 1 - \frac{q_i \otimes M_i \otimes q_i^* \cdot M_r}{\|q_i \otimes M_i \otimes q_i^*\|\|M_r\|} = 1 - \frac{q_i^* \otimes M_r \otimes q_i \cdot M_i}{\|q_i^* \otimes M_r \otimes q_i\|\|M_i\|}$$

In one embodiment the mathematical representation of the system further includes a base vector V defined in either the world frame or the sensor frame and chosen such that it is parallel to the axis around which the rotation of the object being measured is to be neglected, the unused degree of freedom, where in one embodiment the base vector V is used to project the vector F representing the present object orientation to the two used degrees of freedom.

In an embodiment the base vector V is used to initialize or configure the sensor system (X', Y', Z').

Knowing the vector F is aligned such that it is parallel to the unused degree of freedom in the sensor system, if the angles α and β of the vector F to axis of the used degrees of freedom of freedom seen in the sensor system, these may be calculated and used in one of the following applications; angle measurement, X-Y plotting and/or computer mouse cursor control.

Sometimes the system may experience an interruption such as by power off and on, or due to other reasons, therefore device includes a recover from Interrupt algorithm including the steps of measuring sensor data for a few times, meaning making a plural of immediate initializing measurements of the sensor data, and subsequently to produce multiple fast iterations of calculation through the mathematical transfer operator without further reading of the actual sensor data until the output is stable.

To make all the required calculations and store the required data, the detecting ng means is in any data communication to a processer capable of performing the required calculations and store the required data, where this processer may be external or internal to the device.

In an embodiment the device includes a shift between separate mathematical representations when the orientation crosses a critical angel above a horizontal plane being defined as the plane orthogonal to the direction of gravity, these are in the following referred to as vertical and horizontal modes respectively, but in an embodiment the device further or alternatively includes a hybrid mode that utilizes results from both modes by calculating a weighted sum to mix the data, in order to provide a smooth transfer from the Horizontal Mode to the Vertical Mode. The weighted sum is in accordance with the state (e.g. pitch, etc.) of the measured object.

The present invention further introduces the method of operating the device of operating a device in a 3-dimensional movement and where it's orientation is translated into a mathematical 3D representation that then further is transformed into a mathematical 2D presentation, where the device includes an attitude, or orientation, detecting means, where the mathematical representation transformation uses to remove the effects of an unused degree of freedom.

In different embodiments the method of operating the device could include any of the previous described the steps and calculations.

DETAILED DESCRIPTION

Figure 1:
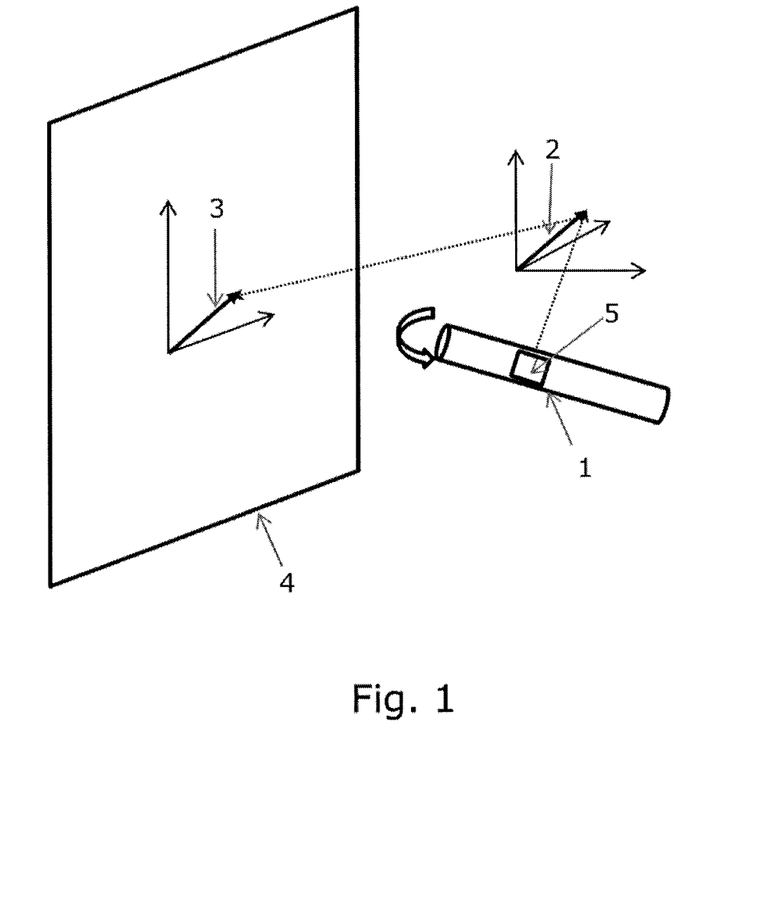
FIG. 1 is an illustration of a device being operated in a 3-dimensional orientation and this being transformed into a 2-dimensional representation.

FIG. 1 illustrates one embodiment usage of the present system where a device (1) is operated by a user in the free space in any 3-dimensional movement and where it's actual orientation, or in alternative wording the attitude, in the free space is translated into a mathematical 3D representation (2). In an embodiment this 3D representation then further is transformed into a mathematical 2D presentation (3) that could be used for representing a change of the orientation of the device (1) as a 2D movement on e.g. a screen (4). In this embodiment the device (1) with advantage could be a cursor pointing device (1) on graphic user interfaces (4) (e.g. air-mouse for a computer) or for gaming, etc., but in general the device (1) could also be used in applications such as data-login, measurements, motion control etc.

In the illustrated embodiment of the illustrated example in the device (1) is an air-mouse, or pointing device, held by a user where its 3-dimensional movement is translated into a 2-dimensional movement of a cursor on a screen (4), but any imaginable other embodiments where a 3-dimensional movement is to be translated into a 2-dimensional representation would also apply to the present invention.

The device (1) includes attitude, or orientation, detecting means (5), such as inertial measurement units (IMU) including e.g. accelerometers and gyroscopes. In one embodiment it further includes magnetometers. It could include any number of such devices, but in the illustrated embodiment it comprises 3 accelerometers and 3 gyroscopes.

The method utilizes the IMU's sensor data and uses a method to transfer 3-dimensional rotations into a meaningful 2-dimensional data representation. The 3-dimensional rotations are represented mathematically by such as the quaternions and/or the Euler angles, yaw, pitch, and roll.

In an embodiment the method further utilizes the mathematical representation uses to remove the effects of an unused degree of freedom.

For many embodiment devices (1) one of the degrees of freedom will not have any desired effect in the 2-dimensional representation. One example is for a pen shaped air mouse device (1). Given the pens pointing direction dictates a 2-dimensional representation, such as a cursor on a screen, then, an unused degree is the rotation around the cylindrical axis, meaning the axis longitudinal to the pointing direction In other more advanced embodiments the device (1) may have to be regarded as sub-parts each individually being represented by their own mathematically 3-dimensional representation and each with their own translation to a 2-dimensional representation. The sub-parts then may be interlinked where the unused degree of freedom would be seen in relation to another part (e.g. another also represented sub-part) of the device (1), where the relative movement to this part only has 2 degrees of freedom. One such example is a robotic arm comprising two or more connected sub-parts through joints. Two such interconnected parts are capable to move relative to each other in the joint, where the movement e.g. can be defined by up and down and side to side and represented by X- and Y-axis in the usual manner, but where the Z-axis would be a translocation relative to the joint which is not possible, thus this is an unused degree of freedom.

Any number of such interconnected sub-parts could be represented by their own 3-dimantional representations etc., selected according to which would be best suited according to the nature of the operation of the individual sub-part.

A typical operation of a device (1) is making a set of measurement data from the accelerometer forming a measurement acceleration vector $A=(A_x, A_y, A_z)$, the number of parameters depending on the number of accelerometers, in the present illustrated embodiment it is assumed there are three forming three orthogonal set of measurements.

In the same manner the gyroscope, in the illustrated embodiment measures three orthogonal data forming the gyroscope vector $\omega=(\omega_x, \omega_y, \omega_z)$.

In the same manner a magnetometer, in an embodiment measures three orthogonal data forming the magnetic vector M=(Mx, My, Mz).

Based on the measured sensor data a mathematical representation thus is formed. This could in an embodiment include the steps of setting up a world frame being a basic reference frame, and then represent the object (1) position in relation to this. The world frame may be initialized at some starting point and/or an object (1) initial position may be set relative to the world frame.

The present orientation of the object (1) at some time period after this time of initialization may then be estimated through the changes in orientation as registered by the sensors in the detecting means (5) (in general when referring to the sensors these are to be understood as those present in the detecting means (5)). This in an embodiment include the steps of estimating a mathematical transition operator between two positions, where this transition operator is estimated on the basis the measured sensor data, such as acceleration vector A, gyroscope vector $\omega=(\omega x, \omega y, \omega z)$ and/or magnetic vector M=(Mx, My, Mz). In the following in general when referring to sensor data, or measured sensor data or measured data is referred to one or more of these vectors A, $\omega$ and/or magnetic vector M.

In one embodiment the mathematical representation is in quaternions and the transition operator being a quaternion q. In another or additional embodiment the system includes a transition operator being a rotation matrix or in an Euler representation.

The mathematical representation of the object (1) at any time then may be calculated based on such iterations of calculations, where the calculated object (1) orientation is used as the input orientation of the object (1) at the next iteration when a new transition operator is estimated based on new sensor data.

The sensors would be in any kind of data communication as it is well known in the art to a processer of any kind as it is well known in the art. The processer may be included in the device (1) itself or may be an external device. The processer comprises the means to store data such as the senor measurements and to make the required algorithms and calculations for the described methods to be performed for the device (1) to operate according to its function.

Figure 2:
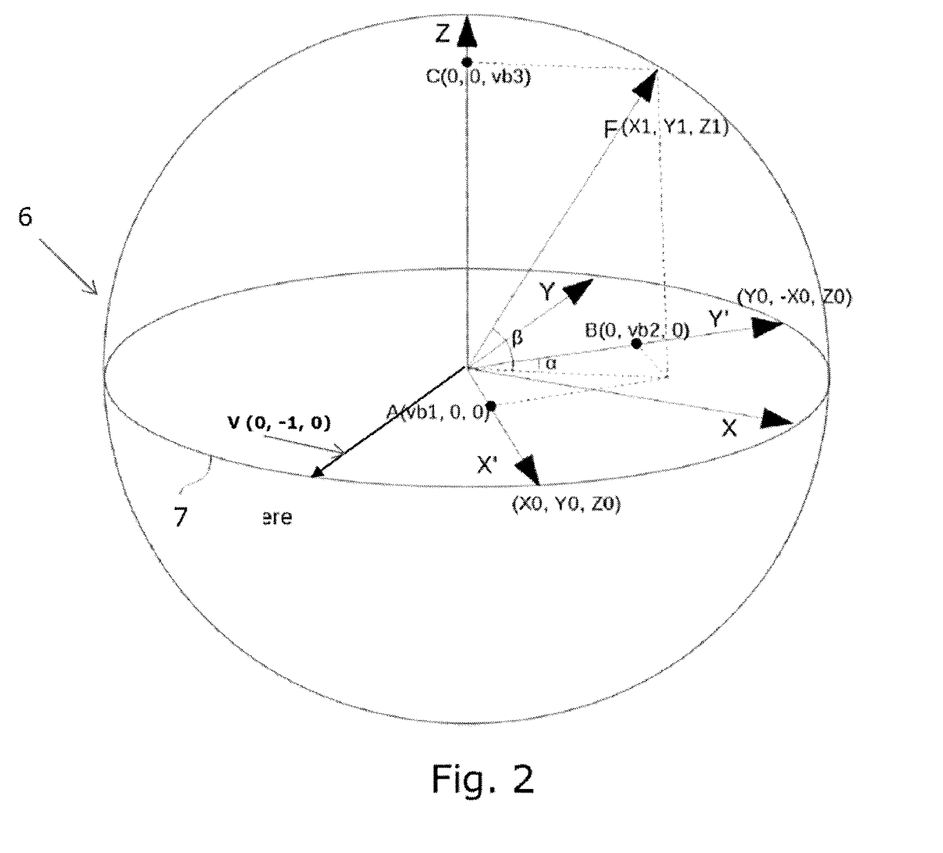
FIG. 2 is an illustration of a unit sphere showing the world frame (X, Y, Z) and sensor frame (X', Y', Z') with a base vector V and a device vector F.

FIG. 2 illustrate a sensor frame unit sphere (6) for the device (1) represented by the three unit vectors X (1, 0, 0), Y (0, 1, 0) and Z (0, 0, 1), and where the vector F (X1, Y1, Z1) represents the device (1) orientation in its sensor frame (X', Y', Z') being a rotation of the world frame (X, Y, Z), where in the illustration of FIG. 2 the 'gravity'-axis Z'=Z, thus being unchanged. The horizontal plane (7) will be defined as the plane expanded by the X and Y vectors and thus orthogonal to the Z-axis, or given the vectors are differently chosen, being orthogonal to the direction of gravity in general. The vector F has the projections A(vb1, 0, 0), B(0, vb2, 0) and C(0, 0, vb3) on the X', Y' and Z' axis respectively.

The Vector F changes its orientation together with the object (1) (which has the orientation or attitude detecting means (5) like an IMU inside) being measured.

In general the orientation of the device (1) is given in relation to the world frame (X, Y, Z) fixed relative to the ground, optionally such that the Z-axis is parallel to the direction of gravity.

In one embodiment a sensor frame (X', Y', Z') further is introduced being linked to the device (1) in a manner where it may be oriented in relation to an unused—or inactive—degree of freedom in the movement of the object (1) seen in relation to the translation from the free space 3-dimensional (2) movement to a 2-dimensional (3) representation, such as the movement of a cursor on a screen. By configuring, or initializing, the sensor system accordingly it becomes fairly easy projecting the vector F representing the present object (1) position to the two active—or used—degrees of freedom to form the 2-dimensional representation (3).

In one embedment a base vector V is defined such that it is parallel to the unused—or inactive—degree of freedom. In an embodiment the system further introduces a base vector, V, as can be seen in FIG. 2, where the vector F (X1, Y1, Z1) representing the device (1) is calculated from the base vector V using the quaternion, q, and where the rotation round the vector F (which is also the same as V if no rotation is applied) is the unused degree of freedom, which means F is changing relative to the world frame as quaternion q changes but remains constant, or the same, relative to the sensor frame. In an embodiment it may also be used to initialize or configure the sensor system (X', Y', Z').

These embodiments will be disclosed in more detail later.

Operational Calculations and Dynamic Gain

When transforming the data obtained from the attitude detecting means (5), like IMU sensor data, the standard method is to calculate the mathematical representation, such as quaternions or Euler forms, by integration of the e.g. gyroscope data, where the accumulated integration error is compensated by the "true" quaternion calculated from the data from the accelerometers and/or magnetometers.

When making two measurements in time of the object (1) moving from a first position to a second position, the difference of the measurement may be represented by a quaternion giving the rotation of the vector representing the measurements corresponding to the position of the device (1). Such a measurement vector may be e.g. the measurements of three accelerometers giving the three orthogonal measurements Ax, Ay and Az, together forming the acceleration vector A=(Ax, Ay, Az). In the same manner the magnetometer measures the magnetic vector M=(Mx, My, Mz).

Let the quaternion $q_{i,2}$ represent the rotation of the object (1) from the first to the second position, this is given by four parameters $q_{1,2}=(q_0, q_1, q_2, q_3)$ and thus making only either the acceleration measurement or the magnetic measurement would only give three parameters and thus it would not be possible making a unique estimate of the quaternion $q_{1,2}$. Having measured both vectors, the acceleration vector A and the magnetic vector M however would give six possible equations and thus it would easily be possible calculating quaternion $q_{1,2}$.

Such calculation is performed every time after a new set of sensor measurement is available, such as the measured acceleration vector A and/or the measured magnetic vector M. Each such calculation is referred to as an iteration.

Since the accelerometer data e.g. represented by acceleration vector A does not reflect the gravity when the system is in an accelerating maneuver; and since the magnetometers may be subject to magnet filed distortion, the "true" quaternion can only be trusted on a statistics basis, where the "true" quaternion refers to quaternion describing the real word movement of the object (1), whereas quaternions used for the actual calculations as described in the following are estimated quaternions expected to be sufficiently close to the "true" quaternion to represent the changing in the orientation of the device (1) mathematically.

In the quaternion representation the quaternion $q_{i+1}$ is the newly calculation after some $i^{th}$ measurements of the sensors being based on the former calculated quaternion, $q_i$.

As previously described above, having e.g. the measured acceleration vector A with three parameters at a certain measured orientation and having the same initial measurement at an initial orientation (where initial just refers to the initial relative to the present measurement and thus could be defined at any time during the operation process of the device (1)), then it is possible to construct three equations, where the quaternion $q_{1,2}$ is regarded as the unknown variable describing the change of orientation of the object (1) linking the two sets of measurements together. In order to solve the equations in a progressive way (so that it won't take too much calculation time during each iteration), typically $q_{1,2}$ can be resolved by an algorithm which is iteration based, such as the Gradient descent algorithm, where $dq_{a,i}$ is the correction of the solution during each iteration formed by the accelerometer measurements. For example, $dq_{a,i}$ represents the Gradient if the Gradient descent algorithm is used. Similarly, $dq_{m,i}$ is the correction of the solution of the equations formed by the magnetometer measurements etc.

The parameter dT is the time elapsed since last measurement, this is also illustrated in equation 1.

$$q_{i+1} = q_i + (dq_{\omega,i} - \eta \times dq_{a,i} - \zeta \times dq_{m,i}) \times dT \qquad \text{Equation 1}$$

Two of the variables in equation 1, eta ($\eta$) and zeta ($\zeta$), relate to weights, or the dynamically determined gain as is to be described in more details.

If the accelerometers measure a total value (e.g. the norm of the 3-dimensional measured accelerometer vector A) data is being different from that of gravity, which it means the device (1) is experiencing accelerating/decelerating maneuvers, then the data of the accelerometers will be less trusted, or less weighted, it's eta ($\eta$), or weight.

In the same manner, if the magnetometer is experiencing interference, i.e. if the Norm of the measured vector M of the magnetometers is larger than or less than the magnitude of the reference earth magnetic field, the magnetometer data in the same manner will be less trusted and it's gain ($\zeta$), or weight, being lower in the calculation than relative to it being closer to the magnitude of the reference earth magnetic field.

In general, if the compensation is too intense, the system output will suffer from severe disturbance; if too slight, the accumulated gyro integration error will grow. The gyro measurement is typically in the form of rotation rate, or the angular speed of itself. In order to calculate the change of orientation, it is required to integrate the angular speed over the time interval between two measurements so that the accumulated changes of angles which represent the sensor's current orientation can be derived. During such process, the measurement error (the difference between the actual angular speed of the sensor and the measured angular speed) will also be integrated, which together with the integration of the true value becomes the basis for the next integration, which means the error will accumulate and cannot be eliminated by the integration process of gyro measurement itself. The angular speed measured by gyro can be mathematically transformed into a quaternion format $dq_{\omega,i}$ representing the change rate of the quaternion.

Figure 3:
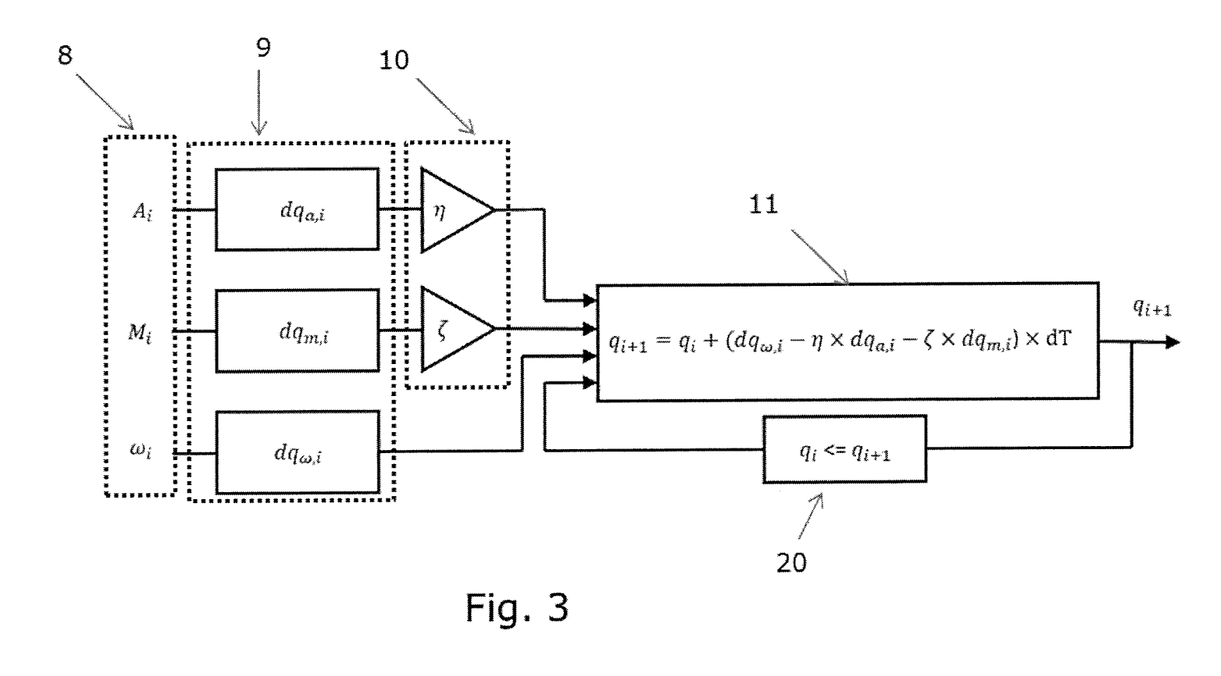
FIG. 3 is an illustration of an iteration of calculation.

FIG. 3 illustrates a work-flow diagram of the calculation algorithm including a dynamically determined gain. The calculation starts with the input measured data (8) of an $i^{th}$ iteration with the calculated change rates of quaternions (9) relative to the latest measurement changes of the respective measurements the separate sensors in the detection device (5), the related calculated present gains (10), these being the input to the calculation (11) according to equation 1 giving the output quaternion of the i+1'th iteration.

In the illustrated embodiment formed of two variables: eta ($\eta$) and zeta ($\zeta$) and including equation 1 with the input the change rate of quaternion determined by gyro measurement $dq_{\omega,i}$, the correction of the solution of the equations formed by accelerometer and magnetometer measurements $dq_{a,i}$ and $dq_{m,i}$ respectively, and the quaternion result from the previous iteration.

In the illustration $A_i$ is the accelerometer measurement for the $i^{th}$ iteration in the calculation in vector form of the acceleration vector A, such as comprising three parameters. This means the measured sensor data as stored is run through an iteration according to the calculation illustrated in FIG. 3, where an updated calculated quaternion of the previous iteration, $q_i$, is used, together with the new measurement during the $i^{th}$ iteration $A_i$ etc., to update the quaternion $q_i$ which results in as the output of the $i_{th}$ iteration, and also as the basis for the following iteration number $(i+1)^{th}$ where $q_{i+1}$ plays a role as if $q_i$ does during the $i^{th}$ iteration.

As also illustrated the calculation include a weighted calculation according to the confidence in the measurements of the measured acceleration vector A and the measured magnetic vector M respectively, where these are formed of the two variables: eta ($\eta$) and zeta ($\zeta$) of the gain.

The embodiment includes dynamical calculations of the two gain parameters based on the following equations.

Calculation of dynamic Gain values ($\eta$) and zeta ($\zeta$)     Equation 2

$$\eta = \sqrt{\frac{3}{4}} \times \frac{\pi}{2} \times (1 - \cos\theta_\eta) \times d_\eta$$

$$\zeta = \sqrt{\frac{3}{4}} \times \frac{\pi}{2} \times (1 - \cos\theta_\zeta) \times d_\zeta$$

where the cosine parts are calculated according to equations 3 and 4.

$$1 - \cos\theta_\eta = 1 - \frac{q_i \otimes A_i \otimes q_i^* \cdot A_r}{\|q_i \otimes A_i \otimes q_i^*\|\|A_r\|} = 1 - \frac{q_i^* \otimes A_r \otimes q_i \cdot A_i}{\|q_i^* \otimes A_r \otimes q_i\|\|A_i\|} \qquad \text{Equation 3}$$

$$1 - \cos\theta_\zeta = \qquad \text{Equation 4}$$
$$1 - \frac{q_i \otimes M_i \otimes q_i^* \cdot M_r}{\|q_i \otimes M_i \otimes q_i^*\|\|M_r\|} = 1 - \frac{q_i^* \otimes M_r \otimes q_i \cdot M_i}{\|q_i^* \otimes M_r \otimes q_i\|\|M_i\|}$$

where $\theta_\eta$ represents the angle difference between the measured $A_i$ vector and the estimated $A_i$ vector calculated by rotating (i.e. change of orientation) $A_r$ using the quaternion $q_i$.

Similarly $\theta_\zeta$ represents the angle difference between the measured $M_i$ vector and the estimated $M_i$ vector calculated by rotating $M_r$ using the quaternion $q_i$.

$$d_\eta = \frac{1}{\left|\left(\frac{\|A_i\|}{\|A_r\|} - 1\right) + 1\right|} \qquad \text{Equation 5}$$

$$d_\zeta = \frac{1}{\left|\left(\frac{\|M_i\|}{\|M_r\|} - 1\right) + 1\right|} \qquad \text{Equation 6}$$

In the equations and illustration $A_i$ is the accelerometer measurement for the $i_{th}$ iteration in vector form of the acceleration vector A, such as comprising three parameters.

The measured sensor data as stored is used for the particular iteration according to the calculation illustrated in FIG. 3, where an updated calculated quaternion of the iteration number i, $q_{i+1}$, is used to update the calculated quaternion $q_{i+2}$, for the following iteration number i+1.

As also illustrated the calculation include a weighted calculation according to the confidence in the measurements, and thus weight in the equations, of the measured acceleration vector A and the measured magnetic vector M respectively, where these are formed of the two variables: eta ($\eta$) and zeta ($\zeta$) of the gain.

Here $A_r$ is a reference gravity field in vector form measured when the respective sensors are at rest, indicating the object (1) is at rest too. The parameter $M_r$ is a reference magnet field of earth measured when the respective sensors are not (or only very slightly) interfered by the magnet field distortion. Again $q_{i+1}$ is the estimated quaternion output of the $i^{th}$ iteration, which is calculated from the previous quaternion output $q_i$ according to e.g. the calculation of FIG. 3 and equation 1 plus the integration of the gyroscope data of the current iteration. q* is the conjugate of q. The math symbol "|| ||" calculates the norm of a vector. The math symbol "| |" calculates the absolute value of a scalar. "$\otimes$" means the Hamilton product.)

The basic concept of the illustrated embodiment solution is that if the accelerometers measure a total value (e.g. the norm of the 3-dimensional measured accelerometer vector A data being different from that of gravity, which it means the device (1) is experiencing accelerating/decelerating maneuvers, the data of the accelerometers then will be less trusted (i.e. lower confidence), it's gain ($\eta$), or weight in the calculation, being lower.

In the same manner, if the magnetometer is experiencing interference, i.e. if the Norm of the measured vector M of the magnetometers is larger than or less than the magnitude of the reference earth magnetic field, the magnetometer data then in the same manner will be less trusted. It's gain ($\zeta$), or weight in the calculation, being lower.

Figure 4A:
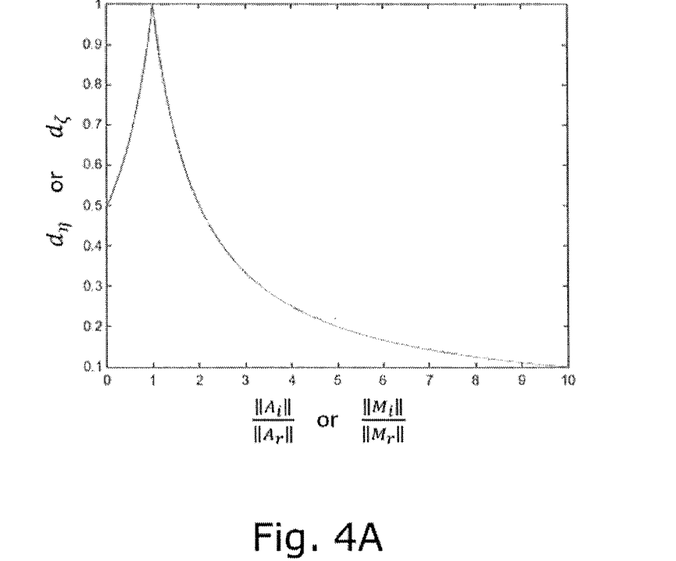
FIGS. 4A,B are illustrations of dynamically calculated gains, or weights, used in the calculations.

The Norm of the measured value from accelerometers which is in the form of a vector in equation 5 is represented by $\|A_i\|$, while the magnitude of the gravity is represented by $\|A_r\|$, which is the accelerometer measurement when the respective sensors, and thus the object (1), are at rest. According to equation 5, if $\|A_i\|$ is different from $\|A_r\|$, then the dynamic gain factor $d_\eta$ reduces accordingly, which is illustrated in FIG. 4A, where $d_\eta$ is a function of the magnitude of the total acceleration $\|A_i\|$ divided by earth gravity $\|A_r\|$. The degree of confidence, or weight, on the measured earth magnitude adjusts dynamically using similar rule. If the measured magnitude of the magnet field $\|M_i\|$ is different to the reference earth magnet field magnitude, according to equation 6, $d_\zeta$ as a factor of the dynamic gain $\zeta$ reduces, which also is illustrated in FIG. 4A.

Figure 4B:
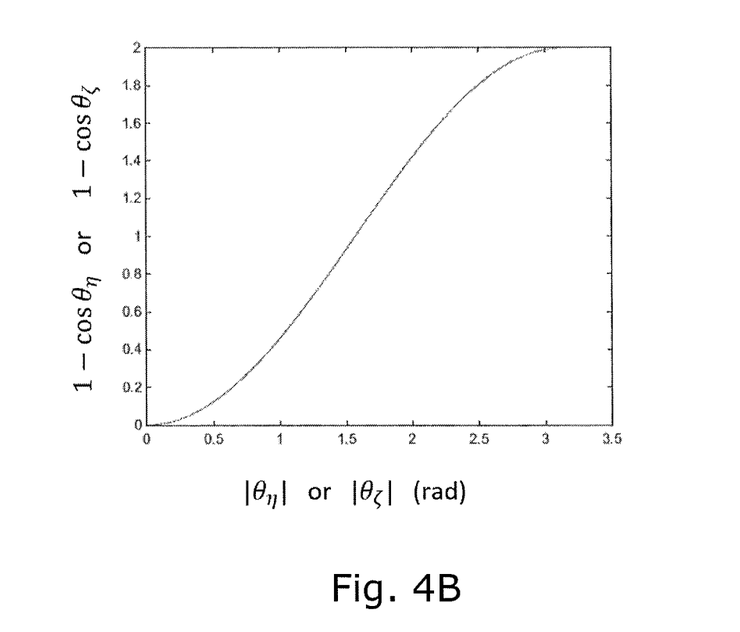

The factor $q^*_i \otimes A_r \otimes q_i$ in equation 3 is the estimated value of $A_i$ and $$\frac{q^*_i \otimes A_r \otimes q_i \cdot A_i}{\|q^*_i \otimes A_r \otimes q_i\| \|A_i\|}$$

calculates the cos $\theta_\eta$ where $\theta_\eta$ is the angle difference between the estimated $A_i$ and the measured $A_i$. FIGS. 4BA shows a plotting of the dynamic components (1−cos $\theta$) as a function of $\theta$, which shows the larger the angle difference, the higher value (1−cos $\theta$) is; when putting together with equation 3, $\eta$ will have a higher value which means the accelerometer measurement is trust more.

For magnetometer, equations 4 and 6 are used to adjust the $\eta$ in equation 2 according to the angle difference between the estimated measure and the actual measurement of the magnet field.

The advantage of the said method: providing an exact and calculation friendly method to achieve the purpose described in the general concept, which provides good balance between the growing errors and compensate speed, and which has been proved during various experiments. Based on the proposed method, it is easy to derive algorithms that do not require any conditional command like "IF" conditions in programming, which can be very efficient in calculation using microprocessors where branch prediction feature is not available.

Base vector

In an embodiment the system further introduces a base vector, V, as can be seen in FIG. 2, where the vector F (X1, Y1, Z1) representing the device (1) is calculated from the base vector V using the quaternion, q, and where the rotation round the vector F (which is also the same as V if no rotation is applied) is the unused degree of freedom, which means F is changing relative to the world frame as quaternion q changes but remains constant, or the same, relative to the sensor frame. Vector F is not necessarily aligned to any of the principle axis of the sensor frame, but may be so. The 2D representation (3) of the device (1) can be acquired by projecting the vector F to the world frame.

The base vector naturally V can be represented in either the world frame or the sensor frame and is chosen such that it is parallel to the axis around which the rotation of the object (1) being measured is to be neglected, the unused degree of freedom. The vector F orientation may be calculated according to base vector V.

In the illustrated embodiment of FIG. 2 the representation of vector F representing the present object (1) orientation is calculated from a base vector V, such as (0, −1, 0).

The following equations 7a and 7b shows two examples of using the base vector V. Equation 7a shows the base vector V being (1, 0, 0) (in quaternion terms (0, 1, 0, 0)) represented in the world system being used in configuring the sensor system (X0, Y0, Z0).

$(X_0, Y_0, Z_0) = q_0 \otimes (0,1,0,0) \otimes \hat{q}_0$    Equation 7a

Though illustrated equation is given in relation to quaternions, but as is the case in general for the present device (1) and methods of operating the device (1) the quaternion is just one mathematical representation for the more general mathematical transition operator between two positions as would apply to embodiments given in alternative mathematical representations.

The equation 7b with the base vector (0, −1, 0) ((in quaternion terms (0, 0, −1, 0)) is used to define the vector F representation (X1, Y1, Z1) through the base vector V. The Hamilton product is represented as it is common represented by the symbol "$\otimes$", and '$\hat{q}$' means the conjugation of the quaternion representing the rotation from the world frame to the sensor frame.

The Vector F (X1, Y1, Z1) thus projected according to the base vector V and an additional rotation by the transition operator, in the illustrated quaternion embodiment this being the rotation quaternion q0 or (matrix rotation in the Euler representation) derived from the iteration method as also described in equation 1 and FIG. 3. The base vector V can be defined in the coordinate system attached to the object (1) being measured, i.e. defined in the sensor frame.

As shown in FIG. 2, Vector F (X1, Y1, Z1) is the above described axis. The Vector F changes its orientation together with the object (which has IMU inside) being measured.

$$(X_1, Y_1, Z_1) = q_1 \otimes (0, 0, -1, 0) \otimes \hat{q}_1 \quad \text{Equation 7b}$$

The quaternions q0 and q1 respectively represent the present transition operators for the sensor system (X0, Y0, Z0) and vector F (X1, Y1, Z1) respectively.

In this manner the base vector is used to 'pull out' the unused—or inactive—degree of freedom.

An important feature of this method is that the direction of the chosen base vector V should be parallel to the axis around which the rotational movement of the measured object (1) should be neglected, the unused degree of freedom.

In a pointing pen embodiment of the device (1) the illustrated base vector B in FIG. 2 this would be the direction parallel to the pointing direction, or the length or longitudinal direction of the pen.

The base vector V could be found in a various different ways. In one embodiment it is in an inherited vector in the processer of the algorithms and calculations, where in an embodiment this at a given initialization stage is aligned according to e.g. gravity to set up the world frame and define the base vector V according to this.

In embodiments the base vector V is found through iteration process including iterations like those used in relation to those of equation 1 and FIG. 2, and as will be described later in relation to when recovering from an interrupt.

Projections of Vector F on the (X' Y' Z) coordinate system in FIG. 2, the sensor system, are calculated as marked in the figure with letter A, B and C. Vb1, Vb2 and Vb3 are the lengths of the respective projection on each axis. In addition, as all vectors are normalized to unit vector. The angles α and β of the vector F to the X'- and Y'-axes respectively, can also be calculated by a simple calculation determined by the geometry relationships as shown in equation 8.

$$Vb_1 = (X_0, Y_0, Z_0) \cdot (X_1, Y_1, Z_1) \quad \text{Equation 8}$$

$$Vb_2 = (Y_0, -X_0, Z_0) \cdot (X_1, Y_1, Z_1)$$

$$Vb_3 = (Z_1)$$

$$\alpha = \operatorname{atan}\left(\frac{Vb_1}{Vb_2}\right) \times \frac{180}{\pi}$$

$$\beta = \operatorname{atan}\frac{Vb_3}{\sqrt{(Vb_1^2 + Vb_2^2)}} \times \frac{180}{\pi}$$

The angles α and β can be used in a wide range of applications such as angle measurement, X-Y plotting and computer mouse cursor control after discrete differentiation. The rotation of object around an axis parallel F has no effect on the results, which is a critical requirement for many applications, such as pointing devices such as a pen shaped computer mouse based on IMU, which should output stable XY data regardless of the rotation around the axis parallel to the longitudinal axis, or the pointing axis of the pen.

Recover from Interrupts

The method also provides better performance when the device recovers from interrupts, which could be anything that for a short or longer time would disrupt the device (1) from making further measurements, or at least from communicating and storing the measurements, such as by when power is turned on after a shut off.

The essential at such an interrupt is to initialize the object position in the world frame, in one embodiment where the object (1) and thus the sensors further is represented through a sensor frame that follows object (1), the transfer operator thus also transferring the sensor frame relative to the world frame.

When the object (1) is back in operation after the interruption it needs to re-initialize, which means it at least needs to initialize its orientation in e.g. the world frame by calculation. In an embodiment this is done by an iteration process.

Such an iteration method could include for each iteration to perform a process of sampling one set of sensor data (gyroscopes, accelerometers, magnetometers or a combination of those) where after the output result is improved by a calculation based on the new knowledge of the sampled data. This iteration repeats continuously, and the result output of each of the iterations tends to follow the actual changes of the orientation of the object. A device using such method will be adjusted in a way such that the convergence rate of each iteration is greater than the actual rate of change of the orientation, and thus if the previous result is close to the actuation orientation of the object, the result of the next iteration will be even closer to the actuation orientation.

This iteration method works well under normal operation conditions, such as when the previous result of iteration is already close to the actual orientation. However, for example when the device has just been powered on, or just recover from interrupts during which such iterations cannot be performed, the iteration result will not converge immediately close to the actual orientation since the previously iteration result is not available or is too far away from the actual value. Instead it is required to wait for a noticeable time (typically at least several seconds) for the results to converge to a stable output. This is a disadvantage since the output after recovering from interrupts or power on cannot be immediately used since the sampling of the sensor data cannot be very fast partly because of the limited speed of communication protocol between the sensors and the processor, and partly for the limited sampling rate of the sensor itself.

To overcome the disadvantage, traditional methods will stop outputting the results when not converged; only simply avoid interrupts by keeping the device running all the time. These solutions are not desirable for (such as a computer pointing device), nor for devices powered by batteries since continuously running takes more energy and shortens the battery life.

In one embodiment the present system introduces and alternative or additional solution to provide better performance in terms of short convergence time when the device recovers from interrupts. It is also suitable for letting the device output converged value immediately after power on or reset regarding the power off/on or the reset themselves can be regarded as some kinds of interrupts.

The short convergence time provides possibilities in applications in e.g. a battery powered device to recover from sleep mode and to output the correct orientations immediately (immediately meaning with a delay which is so short that the user or the other application using the said output will not notice the delay nor be distributed from its normal operation), such that frequent switching between sleep mode and activate mode becomes practical and more energy can be saved and thus longer battery life. Without the improvement, the device has to wait until the output becomes stable each time power is turned on, it is interrupted or reset.

This embodiment includes one or both of the two methods:
(1) Read sensor data for a few times, meaning making a plural of immediate initializing measurements of the sensor data, and subsequently to produce multiple fast iterations of calculation without further reading of the actual sensor data until the output is stable
(2) Reset the iteration base (such as the quaternion) to a known orientation, which can be acquired either by remembering the position before interrupts or by estimations of the movement during the interrupt period.

The first of the methods usually will be used in situations where the object (1) orientation is unknown upon recovering from the interrupt, and is further explained as follows.

The basic idea of the first method to shorten the convergence time after interrupts is based on the assumption that the object orientation remains the same and the object is not moving during the convergence period, or at least only has an insignificant change in orientation seen in relation to the calculations during the time period. Since the orientation is essentially, or at least assumed, to be constant, then sensors also are assumed to be at rest, the expected values of the sensor measurement thus is also assumed to be constant during that time frame. Therefore only a few samples is made of the sensor data which is used to calculate the mean average of each sensor measurement, and use these mean averages as a representations of all the measurements during the convergence period. Thus, the iteration can run multiple times without actually making further sampling of the sensor data which significantly reduces the time required for convergence. Since the iterations is calculated over very short time period seen in relation to the actual physical change of orientation of the object (1), the assumption holds true and thus the method is valid.

Figure 5A:
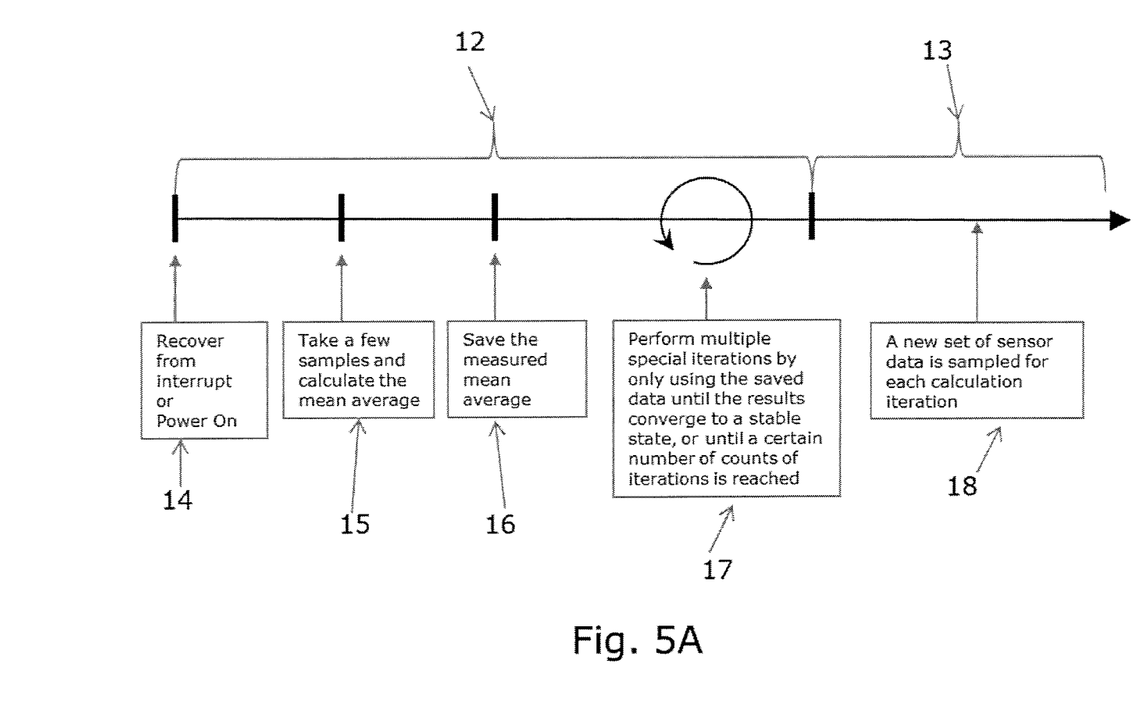
FIGS. 5A,B are illustrations of the steps in relation to recover from interrupt.

FIG. 5A illustrates a time line indicating some of the important time points in the recovering method in using the first method. The operation condition is divided into two stages—Waiting for Convergence (12) and Normal Operation Condition (13), where the first method initializing process runs during the Waiting for Convergence stage. As shown in FIG. 5A, upon recovery form interrupts (14), the device first takes a few sample) sets (15) of each sensor in the detection device (5). The number of sample sets is determined in such a way that the mean average of the samples of respective sensors do not suffer from significant noise, where this number can be determined from experiments.

As also previously described the time used for making the samples is short enough to go undetected by a user of the device (1) and insignificant in relation to the actual movement of the object (1), usually it will be in the order of milliseconds or less. These mean average values are stored (16) in the processor and form the input the multiple iterations of calculations (17), without actually sampling the sensor data each time before doing the calculation.

During these calculation iterations (17), in one embodiment the calculations include artificially generated sampling time intervals simulating the time intervals between the sampling of each of the data sets (e.g. simulating dT in equation 1). This artificial sampling time interval can be of a constant or a variable size. After a number of such special iterations, either given as a fixed number or when the result of a particular iteration compared to the one of the previous iteration changes less than a critical error, the special iteration stops and the device goes into the Normal Operation Condition (13). In the Normal Operation Condition the device (1) is in normal working operation and sensor data is sampled (18) only once before making a calculation for each of the iterations.

Figure 5B:
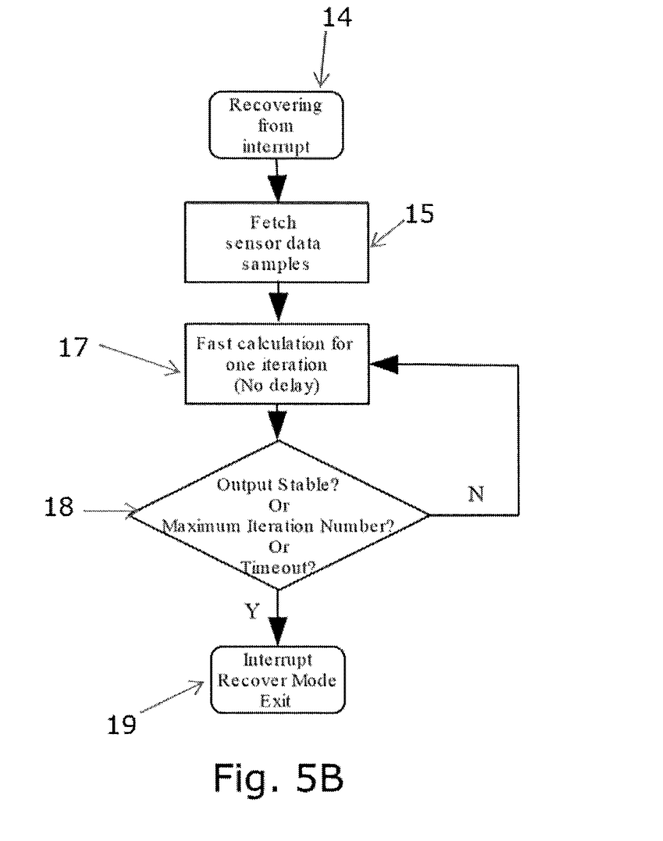

FIG. 5B shows the typical work flow of the Waiting for Convergence (12) stage as illustrated in FIG. 5A. Note that the block of "Fast calculation for one iteration" means doing the calculation of the above described special iteration, where the time interval used for the calculation is typically artificially generated without actually sampling the sensor data and without actually waiting for the time interval before performing the next iteration, which significantly reduces the time required to perform these iterations on a processor and thus shrink the time spent (e.g. several milliseconds in total on a microprocessor) on the stage of Waiting for Convergence. In the end it exits (19) from the interrupt mode, the Waiting for Convergence (12) stage, and enters the Normal Operation Condition (13).

FIG. 2 illustrates a work-flow diagram of the solution algorithm including equation 1 and a dynamically determined gain in the illustrated embodiment formed of two variables: eta ($\eta$) and zeta ($\zeta$), as it has also been described above, the same basic work flow calculations and equations being used when recovering from interrupt.

In FIG. 2 is further seen the conditional iteration part (20) for the calculations to continue in the waiting for convergence stage (12) or stop and continue to the Normal Operation Condition stage (13) where this either could be due to the changes in the outcome quaternion $q_{i+1}$ has become lower than some set threshold, or due to a maximum set of iterations, or a combination of both.

Transfer Between Two Modes

The previously described embodiments use calculations and equations in the quaternion representation, but may alternatively be presented in any other possible mathematical representation, such as, but not limited to the Euler representation. It is mathematically possible to convert from one representation, like the quaternion, to another, such as the Euler representation and vise-versa.

Intuitively the Euler representation is the easiest to comprehend, however also requires heavier calculations. Another drawback in using the Euler representation is that it may suffer from a phenomenon called Gimbal lock which is well known. Further, to calculate Euler angle sometimes suffers from low calculation quality if it is done numerically on a digital device where the float number has limited precision, when the angles approaches 90 degrees (i.e. the singularity).

The conversion between the quaternion and Euler usually is based on the reference Gimbal which is at its initial state wherefore the conversion will not suffer from Gimbal lock. However, the numerical calculation precision still plays a role in reducing the conversion quality when approaching singularity.

In an embodiment of the present system the sensor frame shifts between two mathematical representations under some rule, where these in the following also are referred to as the basic mode, where the two modes in the following are referred to as Horizontal Mode and Vertical Mode respectively. Each of these two basic modes features a re-configurable coordinate system which is calculated by initialization procedures, in order match the system to the initial position of the measured object defined as its position at the time of re-configuration. The redefined coordinate systems are described as (X' Y' Z) in FIG. 4 and FIG. 6 respectively.

As previously described the principle world frame coordinate system (XYZ) is fixed to the ground and in an embodiment having its Z axis being parallel to the direction of gravity, as also illustrated in FIG. 4. The redefined coordinate system (X', Y', Z') attached to the object (1) is as previously referred to as the sensor frame.

1) Horizontal Mode: This mode, also referred to as the small angle mode, is used when the rotational movement to be eliminated is rotating on an axis which has a small angle with the horizontal plane (7), where the horizontal plane may be defined as the plane orthogonal to the direction of gravity, this angle is referred to as the critical angle. The exact angle could depend on the actual system and use of it and can be defined according to particular applications, but typically is less than 80 degrees, or less than 70 degrees, or less than 60 degrees, or less than 50 degrees or less than 40 degrees. This device thus enters into the Horizontal mode when the angle with the horizontal plane gets below or equal to the critical angle. In one embodiment the Horizontal mode includes representing the system through quaternions.

Figure 6:
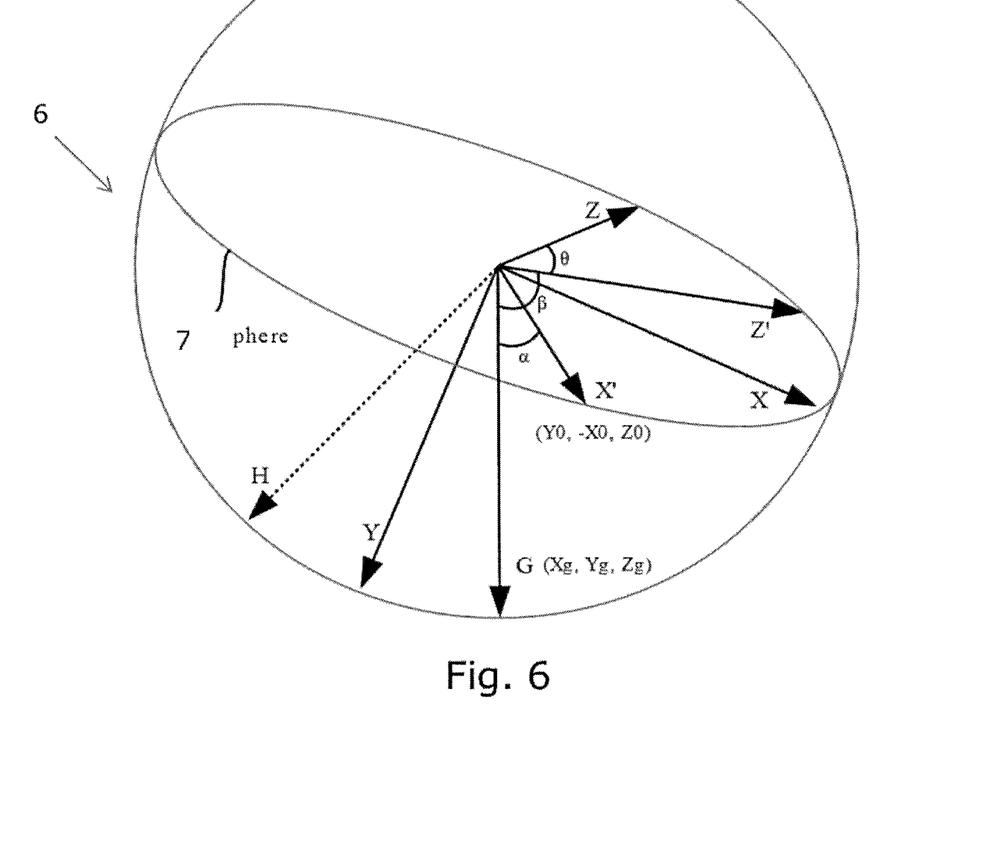
FIG. 6 is an illustration of a unit sphere showing the world frame (X, Y, Z) and sensor frame (X', Y', Z') with gravity vector G.

2) Vertical Mode: The vertical mode, also referred to as the large angle mode, removes the singularity when the Vector F in FIG. 4 has a 90 degree angle against the horizontal plane (7), increases the preciseness when the angle becomes large, meaning above the critical angle (or equal to or above) and eliminates the rotation effects around the axis parallel to the one that has a small angle with the direction of gravity. As shown FIG. 4, the angle α and β are in relation with the 2-dimensional representation and can be calculated in a similar way as the Horizontal Mode. In FIG. 6, when calculating α and β, the axis of rotation that need to be neglected is the gravity in the figure represented by vector G ($X_g$, $Y_g$, $Z_g$), while it can also be another vector chosen under other different backgrounds such as H in the figure. In an embodiment the vertical mode includes representing the system through an Euler representation.

3) Hybrid mode: This mode Utilizes results from both modes by calculating a weighted sum to mix the data, in order to provide a smooth transfer from the Horizontal Mode to the Vertical Mode. The weighted sum is in accordance with the state (e.g. pitch, etc.) of the measured object.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A device configured to be operated in a 3-dimensional movement, orientation of the device being translated into a mathematical 3-dimensional representation and then further into a mathematical 2-dimensional presentation to remove movement effects of an unused degree of freedom, the device comprising:
   attitude, or orientation, detecting sensors; and
   a processor operatively connected to the attitude, or orientation, detecting sensors;
   wherein the processor is configured to iteratively estimate the present orientation of the device through changes in orientation as registered by the attitude, or orientation, detecting sensors, the processor estimating a mathematical transition operator between two orientations, where the mathematical transition operator is estimated on the basis of measured sensor data registered by the attitude, or orientation, detecting sensors, the mathematical transition operator being a quaternion q, and where iteration calculations of the new quaternion $q_{i+1}$ representing the latest change in position of the device as measured by the attitude, or orientation, detecting sensors are calculated according to an equation $$q_{i+1} = q_i + (dq_{\omega,i} - \eta \times dq_{a,i} - \zeta \times dq_{m,i}) \times dT$$

where $q_i$ is the quaternion before the latest change in position of the device as measured by the attitude, or orientation, detecting sensors, η and ζ are gain values, or weights, dT is the time elapsed since last measurement and $dq_{\omega,i}$, $dq_{a,i}$ and $dq_{m,i}$ are the gradient, or correction, of the respective quaternions solution during the iteration; and
   wherein the processor dynamically calculates the two gain values η and ζ based on the measured sensor data registered by the attitude, or orientation, detecting sensors according to the equations:

$$\eta = \sqrt{\frac{3}{4}} \times \frac{\pi}{2} \times (1 - \cos\theta_\eta) \times d_\eta$$

and $$\zeta = \sqrt{\frac{3}{4}} \times \frac{\pi}{2} \times (1 - \cos\theta_\zeta) \times d_\zeta$$

where $$1 - \cos\theta_\eta = 1 - \frac{q_i \otimes A_i \otimes q_i^* \cdot A_r}{\|q_i \otimes A_i \otimes q_i^*\|\|A_r\|} = 1 - \frac{q_i^* \otimes A_r \otimes q_i \cdot A_i}{\|q_i^* \otimes A_r \otimes q_i\|\|A_i\|}$$

and $$1 - \cos\theta_\zeta = 1 - \frac{q_i \otimes M_i \otimes q_i^* \cdot M_r}{\|q_i \otimes M_i \otimes q_i^*\|\|M_r\|} = 1 - \frac{q_i^* \otimes M_r \otimes q_i \cdot M_i}{\|q_i^* \otimes M_r \otimes q_i\|\|M_i\|}.$$

2. The device according to claim 1, where the 2-dimensional representation is calculated based on an object orientation vector F seen on the two used degrees of freedom.

3. The device according to claim 2, where said detecting sensors include an accelerometer and gyroscope and a magnetometer.

4. The device according to claim 3, where the device comprises least three of one or some of the said accelerometer, gyroscope and / or magnetometer positioned to generate a measured sensor data vector, such as a measurement acceleration vector A=(Ax, Ay, Az), gyroscope vector ω=(ωx, ωy, ωz) and/or magnetic vector M=(Mx, My, Mz).

5. The device according to claim 1, where the mathematical representation includes a world frame being a basic reference frame coordinate system being fixed and a sensor frame being a rotation of the world frame, and where an object orientation is represented by the vector F in the sensor frame.

6. The device according to claim 5, where the vector F it is parallel to the unused degree of freedom.

7. The device according to claim 1, where the mathematical representation of the system further includes a base vector V defined in either the world frame or the sensor frame and chosen such that it is parallel to the axis around which the rotation of the object being measured is to be neglected, the unused degree of freedom.

8. The device according to claim 7, where the vector V is used to project the vector F representing the present object orientation to the two used degrees of freedom.

9. The device according to claim 7, where the vector V is used to initialize or configure the sensor system.

10. The device according to claim 1, where the angles α and β of the vector F to axis of the used degrees of freedom seen in the sensor system is calculated and used in one of the following applications; angle measurement, X-Y plotting and/or computer mouse cursor control.

11. The device according to claim 1, where the device includes a recover from Interrupt system configured to make a plural of immediate initializing measurements of the sensor data, and subsequently to produce multiple fast iterations of calculation through the mathematical transfer operator without further reading of the actual sensor data until the output is stable.

12. The device according to claim 1, where detecting sensors are, in any data communication to a processor, capable of performing the required calculations and storing the required data.

13. The device according to claim 1, wherein the device includes a shift between separate mathematical representations when the orientation crosses a critical angel above a horizontal plane being defined as the plane orthogonal to the direction of gravity.

14. A method of operating a device in a 3-dimensional movement, the device includes attitude, or orientation, detecting sensors, orientation of the device being translated into a mathematical 3-dimensional representation and then further into a mathematical 2-dimensional presentation, to remove movement effects of an unused degree of freedom, the method comprising:

estimating the present orientation of the device iteratively through changes in orientation as registered by the attitude, or orientation, detecting sensors, the estimating including the steps of estimating a mathematical transition operator between two orientations, where the mathematical transition operator is estimated on the basis of measured sensor data registered by the attitude, or orientation, detecting sensors, the mathematical transition operator being a quaternion q, and where iteration calculations of the new quaternion $q_{i+1}$ representing the latest change in position of the device as measured by the attitude, or orientation, detecting sensors are calculated according to an equation $$q_{i+1} = q_i + (dq_{\omega,i} - \eta \times dq_{a,i} - \zeta \times dq_{m,i}) \times dT$$

where $q_i$ is the quaternion before the latest change in position of the device as measured by the attitude, or orientation, detecting sensors, $\eta$ and $\zeta$ are gain values, or weights, dT is the time elapsed since last measurement and $dq_{\omega,i}$, $dq_{a,i}$ and $dq_{m,i}$ are the gradient, or correction, of the respective quaternions solution during the iteration; and dynamically calculating the two gain values $\eta$ and $\zeta$ based on the measured sensor data registered by the attitude, or orientation detecting sensors;

wherein the gain values $\eta$ and $\zeta$ are calculated according to the equations $$\eta = \sqrt{\frac{3}{4}} \times \frac{\pi}{2} \times (1 - \cos\theta_\eta) \times d_\eta$$

and $$\zeta = \sqrt{\frac{3}{4}} \times \frac{\pi}{2} \times (1 - \cos\theta_\zeta) \times d_\zeta$$

where $$1 - \cos\theta_\eta = 1 - \frac{q_i \otimes A_i \otimes q_i^* \cdot A_r}{\|q_i \otimes A_i \otimes q_i^*\| \|A_r\|} = 1 - \frac{q_i^* \otimes A_r \otimes q_i \cdot A_i}{\|q_i^* \otimes A_r \otimes q_i\| \|A_i\|}$$

and $$1 - \cos\theta_\zeta = 1 - \frac{q_i \otimes M_i \otimes q_i^* \cdot M_r}{\|q_i \otimes M_i \otimes q_i^*\| \|M_r\|} = 1 - \frac{q_i^* \otimes M_r \otimes q_i \cdot M_i}{\|q_i^* \otimes M_r \otimes q_i\| \|M_i\|}.$$

15. The method of operating the device according to claim 14, where the 2-dimensional representation is calculated based on an object orientation vector F seen on the two used degrees of freedom.

16. The device according to claim 2, where the mathematical representation includes a world frame being a basic reference frame coordinate system being fixed and a sensor frame being a rotation of the world frame, and where the device orientation is represented by the vector F in the sensor frame.

17. The device according to claim 2, where said detecting sensors include an accelerometer and gyroscope.

18. The device according to claim 1, where the measured sensor data is an acceleration vector A=(Ax, Ay, Az), gyroscope vector ω=(ωx, ωy, ωz) and/or magnetic vector M=(Mx, My, Mz).

19. The method according to claim 14, where the measured sensor data is an acceleration vector A=(Ax, Ay, Az), gyroscope vector ω=(ωx, ωy, ωz) and/or magnetic vector M=(Mx, My, Mz).

* * * * *

UNITED STATES PATENT AND TRADEMARK OFFICE
CERTIFICATE OF CORRECTION

PATENT NO. : 10,551,939 B2
APPLICATION NO. : 15/557528
DATED : February 4, 2020
INVENTOR(S) : Sang et al.

Page 1 of 1

It is certified that error appears in the above-identified patent and that said Letters Patent is hereby corrected as shown below:

On the Title Page

Item (22) PCT Filed, please replace "Apr. 10, 2016" with -- March 10, 2016 --.

In the Claims

Claim 1, Column 18, Line 5, please replace "$dq_{wi}$" with -- $dq_{w,i}$ --.

Signed and Sealed this
First Day of September, 2020

Andrei Iancu
*Director of the United States Patent and Trademark Office*